Nov. 14, 1950 A. KROMHOUT 2,529,505
MULTIPORT VALVE
Filed Nov. 13, 1944 3 Sheets-Sheet 1

Inventor
Andrew Kromhout

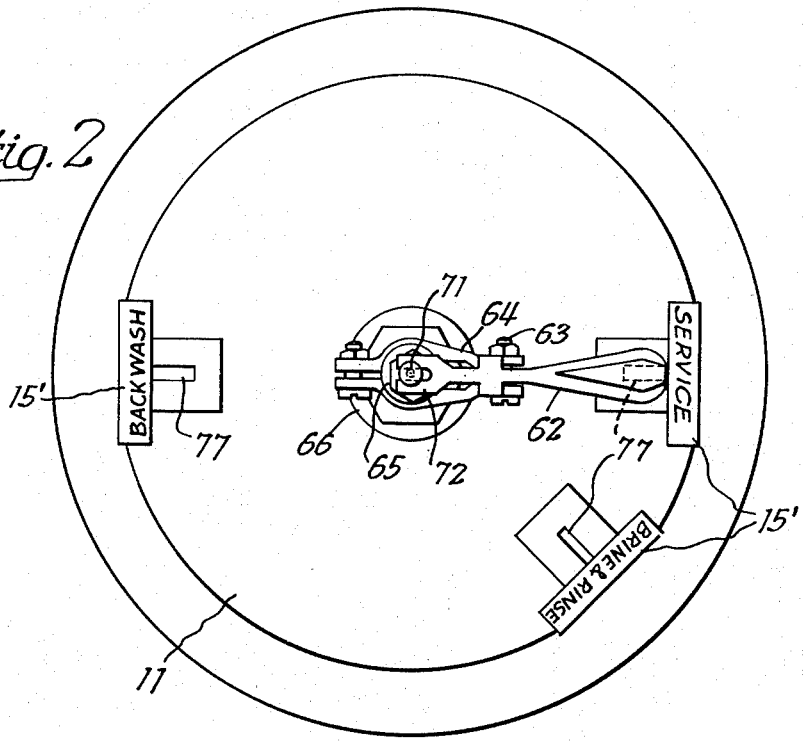
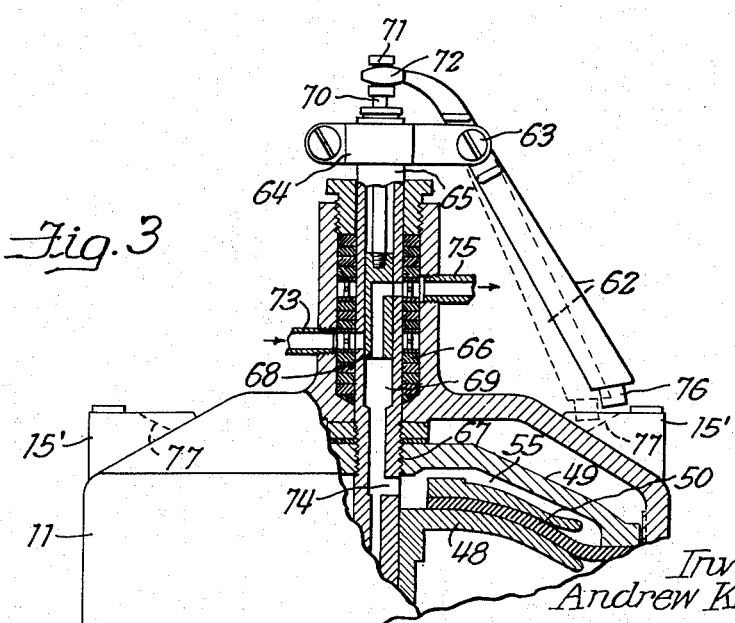

Nov. 14, 1950          A. KROMHOUT          2,529,505
                       MULTIPORT VALVE
Filed Nov. 13, 1944                        3 Sheets-Sheet 3
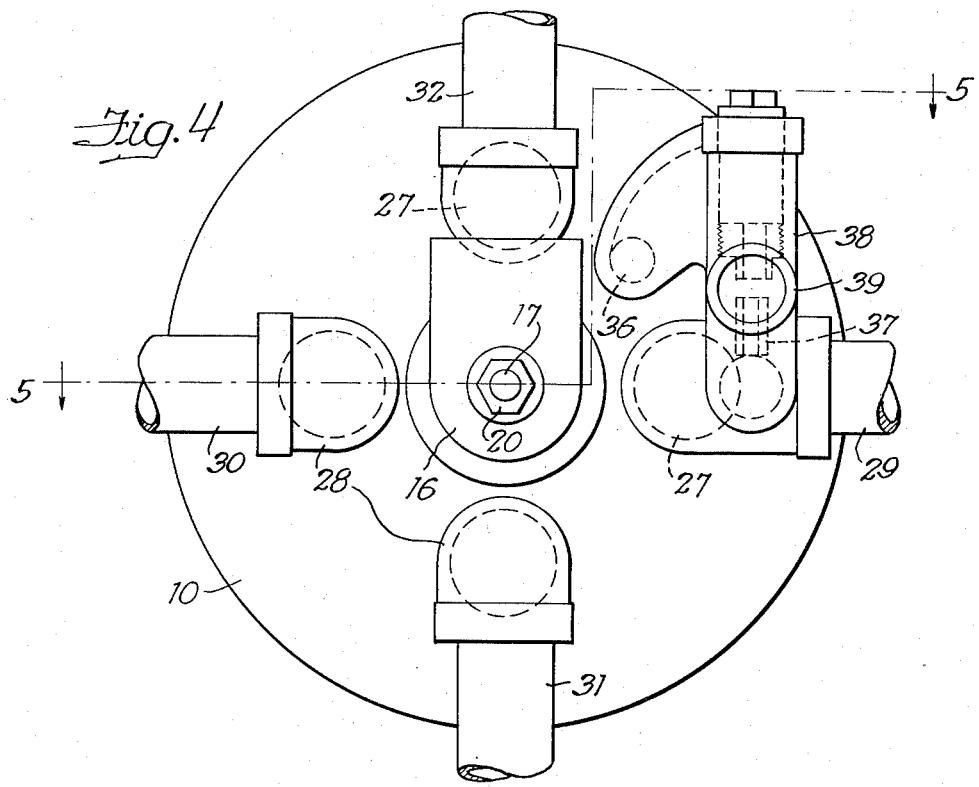
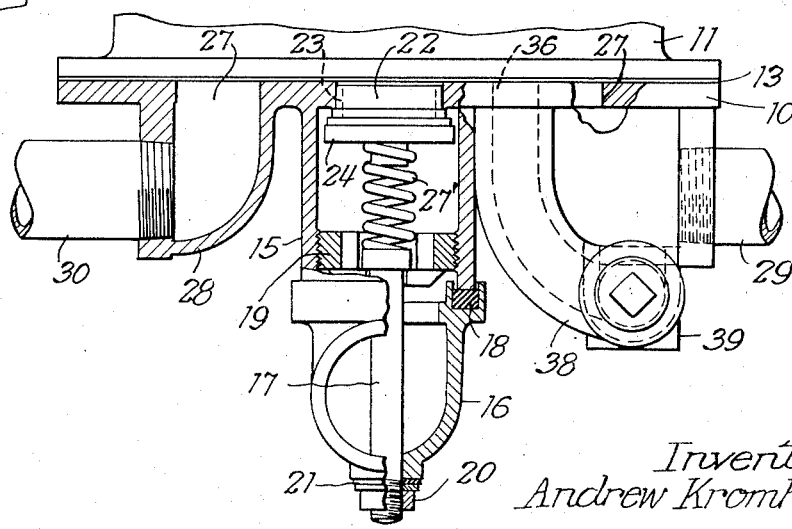
Inventor
Andrew Kromhout
Andrew F. Wintercorn
atty.

Patented Nov. 14, 1950

2,529,505

UNITED STATES PATENT OFFICE 2,529,505

MULTIPORT VALVE

Andrew Kromhout, Elgin, Ill., assignor to Elgin Softener Corporation, Elgin, Ill., a corporation of Illinois Application November 13, 1944, Serial No. 563,187

22 Claims. (Cl. 277—20)

This invention relates to multiport valves.

Multiport valves have heretofore been so designed and constructed that the stem plate was lifted from the seat before turning the same to another position, the lifting being with a view to eliminating wear and tear on the seat or gasket in the turning of the stem plate from one position to another. In some cases the stem plate was adapted to be turned without lifting and it would accordingly drag on the gasket or gaskets, and in such cases where there was heavy hydraulic pressure, there was accordingly increased drag on the gaskets, making it harder to turn the stem plate besides tending to damage the gaskets. On larger sized valves of both types mentioned, it has been necessary to provide an ordinary hand-operated valve on the inlet side to shut off the flow before the stem plate was shifted from one position to another. However, even though this hand valve was closed, it was found to be difficult on larger valves to lift the stem plate or rotate it due to the hydraulic pressure left on the stem plate after the hand valve was closed. In those cases where a hand valve was not used on the inlet side of the multiport valve, the shifting of the valve from one position to another caused a surge and sometimes a very violent water hammer. Oftentimes when the multiport valve was shifted from service position to backwash position, the flow of water through the valve and through the water conditioning unit, such as a filter or softener, came with such a sudden inrush into the bottom of the water conditioning unit and out from the top thereof that the bed was apt to be lifted and mineral lost to the drain. Packed beds under such conditions were apt to have the gravel distributing bed therebeneath disrupted and shifted from its normal relationship to the mineral above.

It is, therefore, the principal object of my invention to provide a new and improved multiport valve not subject to the objections mentioned by providing as a part of the valve itself facilities for shutting off the flow of incoming water to eliminate hydraulic pressure from the stem plate automatically preliminary to the shifting of the valve from one position to another, thereby obviating the necessity for a separate hand valve which a careless or uninitiated operator might fail to close at the proper time.

Another object of the invention is to provide a multiport valve in which the stem plate is held in a sealed operative position with respect to the body member under hydraulic pressure applied to a diaphragm attached to a pressure plate movable toward and away from the stem plate and arranged to apply or relieve pressure on spring means interposed between the pressure plate and the stem plate, the pressure plate also having a portion which in the movement of the pressure plate toward the stem plate unseats a shut-off valve and in its movement away from the stem plate permits said shut-off valve to close, whereby to connect the multiport valve with the water supply line and disconnect the same therefrom automatically in the desired relation to the seating and unseating of the stem plate and the shifting thereof from one operative position to another.

Still another object consists in the provision of multiport valves of the kind mentioned in which the hand lever or other means for turning the stem plate operates a small pilot valve in the stem to admit water under pressure to the diaphragm chamber, or relieve such pressure preliminary to the turning of the stem plate, the handle being preferably normally locked against turning while disposed in a position admitting water under pressure to the diaphragm chamber so that there will be no likelihood of anyone attempting to turn the stem plate before the shut-off valve has been closed.

The invention is illustrated in the accompanying drawings, in which—

Fig. 2 is a top view of the valve on a small scale;

Fig. 3 is a view partly in side elevation and partly in central vertical section through the upper portion of the valve on the same scale as Fig. 2, showing the relationship of the control handle to the pilot valve;

Fig. 4 is a bottom view of a valve like that shown in Figs. 1 to 3, showing a swivel hard water inlet fitting adjustable throughout 360° to facilitate installation of the valve, and Fig. 5 is a section on the broken line 5—5 of Fig. 4.

The same reference numerals are applied to corresponding parts throughout the views.

Figure 1:
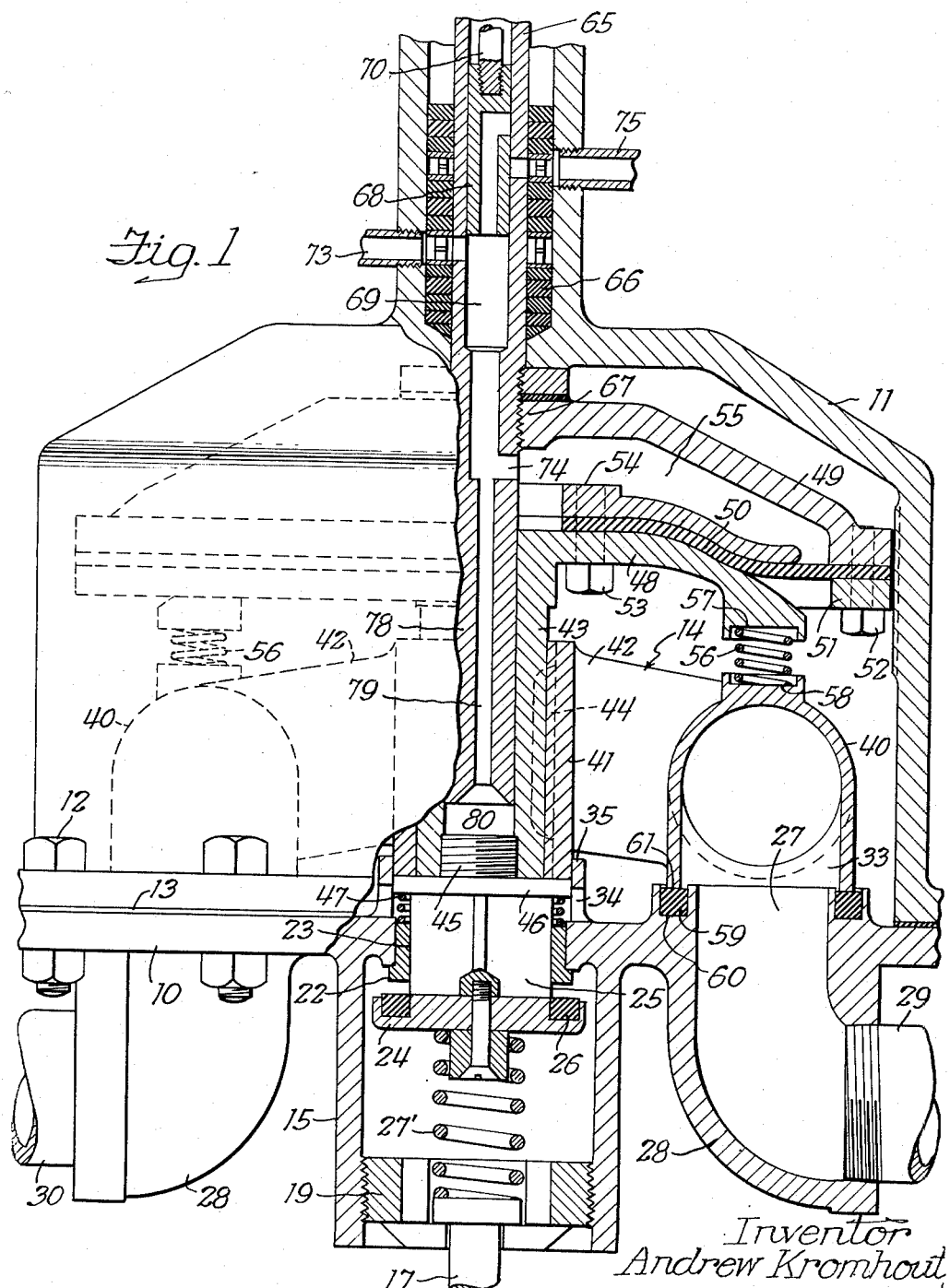
Fig. 1 is a view partly in side elevation and partly in central vertical section through a multiport valve made in accordance with my invention, the valve being shown in normal operating condition with the diaphragm chamber under pressure.

Referring first to Figs. 1 to 3, the reference numeral 10 designates the stator or body member of the valve on which a cap or cover 11 is suitably secured, as indicated at 12, compressing a gasket 13 therebetween to prevent leakage. The cover encloses the rotor or stem plate 14 which in its three operative positions—"service," "backwash," and "salt wash" or "brine and rinse"—as indicated by the legends 15' on the cover, controls the flow of water through the valve by providing a different system of communication between the various ports in the body 10 in each of the three positions. It should be understood that although the valve is one especially designed for use in controlling the flow of water to and from a zeolite water softener, the invention is not limited to that or any other specific application but is applicable to valves generally.

The body 10 has a central downwardly projecting inlet neck portion 15 for connection with the raw water supply pipe, and a swivel fitting 16 connected to the raw water supply pipe is arranged to be clamped by means of a bolt 17 in any position of rotary adjustment through 360° relative to the neck 15, compressing a gasket 18 between the neck and fitting to prevent leakage. The bolt 17 is supported at its head end in a spider plug 19 threaded into the neck 15, and a nut 20 threads on the lower end of the bolt which projects through a hole in the bottom wall of the fitting 16, compressing a gasket 21 to prevent leakage. The swivel fitting 16 greatly simplifies installation of the valve, because it permits extending the raw water supply pipe to the valve from any direction. A valve seat ring 22 is provided in the pressure or inlet port 23 in the body 10 at the inner end of the neck 15 for cooperation with a shut-off valve 24. This valve has a guide member 25 slidable in the ring 22 and a gasket 26 for water-tight sealing engagement on the seat provided on the ring 22. A coiled compression spring 27' bearing on the head end of the bolt 17 tends normally to move the shut-off valve upwardly to closed position, but the valve is arranged to be unseated automatically in the seating of the stem plate 14, as will soon appear. There are four ports in the body 10 like the port 27', 90° apart and at the same radial distance from the central pressure port 23, and these ports communicate with hollow bosses 28 of elbow form projecting downwardly from and formed integral with the body 10 adapted for connection to pipes 29 and 30 that extend to and from the opposite ends of a softener tank, pipe 31 connected to the service system, and pipe 32 extending to a drain receptacle. The stem plate 14 has a number of circumferentially spaced ports like the port 33 provided therein, adapted to register with the ports 27 in different positions of the stem plate, one of the ports 27 being left uncovered for discharge therethrough of raw water under pressure from inside the cover 11 when the stem plate 14 is seated and the shut-off valve 24 accordingly unseated. Raw water is delivered from the port 23 into the cover through a series of circumferentially spaced openings 34 in the lower portion of a guide neck 35 that projects upwardly from the center of the body 10 in concentric relation to the neck 15. There is a smaller port 36 in the body 10 arranged to register with an auxiliary port provided in the stem plate 14 in the brine and rinse position, whereby raw water under pressure is delivered to an ejector nozzle 37 inside the hollow boss 38 for delivery of brine mixed with raw water to the softener through the pipe 29, the brine being delivered to the boss 38 through the branch 39 behind the ejector nozzle 37 in a manner well known in the water softener art.

The operation of the valve as thus far described can be followed by reference to Figs. 1, 2 and 4. In the normal softening operation, the incoming raw water from the pressure or supply port 23 flows into the cover 11 and leaves the valve through pipe 29 extending, let us say, to the top of a softener for passage downwardly through the bed of softening material therein. The softened water leaving the bottom of the softener flows through pipe 30 back to the valve and through one of the communication bosses 40 forming an integral part of the stem plate 14 and out to the service system through pipe 31. This flow continues until the softener requires regeneration, whereupon the operator, as will later appear, shifts the stem plate 14 to the backwash position 180° removed from the service position. During backwash, the incoming raw water from the pressure port 23 is conducted to the bottom of the softener through pipe 30 for passage upwardly through the bed of water softening material so as to break up the bed preparatory to the salt wash, and also wash out from the top of the softener whatever sediment accumulated on top of the bed during softening. The water leaving the top of the softener is conducted back to the valve through pipe 29 and passes through one of the communication bosses 40 in the stem plate and is discharged to the drain through pipe 32. This backwash is continued for a predetermined time sufficient to thoroughly cleanse the bed and prepare it for the salt wash. During this interval raw water may be by-passed to the service system directly from the inside of the cover 11 through pipe 31. After the backwash, the operator, as will later appear, shifts the stem plate 14 to the brine and rinse position that is approximately 135° removed from the backwash position, as indicated in Fig. 2. During the salt wash, the incoming raw water is delivered through the port 36 so that water is discharged through the ejector nozzle 37 and out of the valve through pipe 29 leading to the top of the softener. A valve in the brine supply pipe extending to the branch 39 is opened at this time so that brine may be siphoned from a brine tank and discharged with the water into the top of the softener. The mixture of brine and water flowing downwardly through the bed of water softening material regenerates the same and the spent brine and released calcium and magnesium is discharged from the bottom of the softener and re-enters the valve through pipe 30 and is conducted through one of the communication bosses 40 to the pipe 32 for discharge to the drain. This salt wash continues until the level in the brine tank drops to a predetermined point, whereupon the brine valve is closed but the raw water flow continued until the water discharged to the drain tests soft, whereupon the operator, as will later appear, shifts the stem plate 14 back to the service position. During the salt wash and rinse, raw water may be by-passed to the service system directly from the cover 11 through pipe 31.

The stem plate 14 has a central hub portion 41 connected by spoke or web portions 42 with the communication bosses 40, the latter being struck on arcs of the same radius and being of sufficient length to provide the desired intercommunication between body ports in the different positions of the stem plate described. The lower end portion of the hub 41 is slidable in the guide neck 35 for up and down movement of the stem plate. A hollow operating stem or plunger 43 is keyed to the hub 41, as indicated at 44, and has its lower end closed by a plug 45 on which an annular flange 46 is provided which overlaps the lower end of the hub 41 so that the shut-off valve spring 27' and a coiled compression spring 47, seated on the upper end of the ring 22 and bearing against the bottom of the flange 46, will, when there is no opposing pressure in a downward direction, serve to raise the stem plate 14 with the stem 43 to unseated position with respect to the ports 27 and 36 in the body 10. The spring 47 may be omitted, because when the pressure holding the stem plate 14 is relieved the shut-off valve 24 will close under pressure and lift the stem plate with it off its seat. To avoid too sudden closing of the shut-off valve, I may provide for gradual relief of the seating pressure on the stem plate, as will soon appear. The stem 43 has a pressure plate 48 formed integral with the upper end thereof, preferably of mushroom shape, so as to fit more or less compactly within the dished back plate or housing 49 in the raised retracted position of the pressure plate. A flexible diaphragm 50 of rubber or rubberized fabric material is clamped at its outer marginal portion to the outer marginal portion of the back plate 49 by a ring 51 and bolts 52, and is fastened by its inner marginal portion to the back of the pressure plate 48 by bolts 53 which extend through holes in the pressure plate and through holes in the diaphragm and are threaded in holes in a ring 54 so as to clamp the diaphragm in place therebetween. In that way a closed diaphragm chamber 55 is formed, into which water under pressure, preferably from the same raw water supply pipe that is connected with the inlet connection 16, may be admitted to force the pressure plate 48 downwardly to seat the stem plate 14, the coiled compression springs 56 being compressed in this downward movement to hold the stem plate seated resiliently under sufficient pressure to avoid likelihood of any leakage from one body port to another. In some installations where compressed air is available, or any other fluid under pressure, water might not be used. It will be understood that I do not limit this invention to the use of springs 56, because, obviously, the pressure plate 48 might press directly against or be rigid or even integral with the stem plate 14. The springs 56 have engagement at their upper ends in seats 57 provided therefor in the marginal portion of the pressure plate 48, and have engagement at their lower ends in other seats 58 provided on top of the bosses 40. Gaskets 59 are inserted in annular recesses 60 provided in the body 10 around the ports 27 and 36, and are arranged to have the ring shaped projections 61 that surround and define the ports 33 in the stem plate impressed slightly in the compressible material of these gaskets so as to insure good sealing. Obviously, when the stem plate is lifted, the pressure inside the cover is relieved through the drain port. Now, the gaskets 59 may, if desired, project from the recesses 60 for broader engagement with flat faces on the bottom of the stem plate, in which event the stem plate need not be lifted clear off the body ports in order to permit turning of the stem plate, it being sufficient under such conditions if the seating pressure of the springs 56 is relieved by relief of the pressure in the chamber 55. In the event the stem plate is not lifted off the seats, the pressure inside the cover may be relieved in any suitable way through the drain port.

Any suitable or preferred means of an automatic or semi-automatic form may be provided for operating the valve, although a manually operable lever 62 is shown. The lever 62 is pivoted, as at 63, on a bracket 64 fastened to the upper end of the stem 65. The stem extends through a stuffing box 66 provided on the top of the cover 11 and is connected inside the cover to the back plate 49 at the center thereof, as indicated at 67, whereby to permit turning the back plate 49 and the stem plate 14 with it by means of the handle 62 whenever the pressure in the chamber 55 is relieved, the back plate 49 serving to transmit rotation to the stem plate 14 through the diaphragm 50, pressure plate 48, stem 43, and key 44. A pilot valve 68 is reciprocable in a bore 69 provided in the stem 65 and has an operating stem 70 projecting from the upper end of the stem 65 and provided with an annularly grooved head 71 on its outer end which is straddled by the forked end 72 of the lever 62 so that oscillatory movement of the handle causes reciprocatory movement of the pilot valve. When the pilot valve 68 is raised, as shown in Fig. 1, water or other fluid under pressure is delivered through pipe 73 to the diaphragm chamber 55 through the bore 69 and communicating port 74, but when the pilot valve is lowered, as shown in Fig. 3, the diaphragm chamber 55 is placed in communication with a drain pipe 75 that is at atmospheric pressure. In other words, the handle 62 must be moved outwardly from the dotted line position, shown in Fig. 3, to the full line position in order to relieve the pressure in the diaphragm chamber 55 and permit the stem plate 14 to be turned from one operative position to another with the handle. A key projection 76 is accordingly provided on the outer end of the lever 62 for engagement in slots 77 in the bosses 15' provided on the cover 11, whereon the legends designating the different operative positions of the stem plate are provided, as previously described. The projection 76 enters the slot 77 only when the lever 62 is moved inwardly to the dotted line position shown in Fig. 3, and in that position pressure is admitted to the diaphragm chamber 55 to hold the stem plate 14 seated. The operator, under these conditions, is prevented from turning the stem plate until he has moved the handle 62 to the full line position shown in Fig. 3, relieving the pressure in the diaphragm chamber. It should be clear that by providing either a fixed or a variable restriction in the pipe 75, the pressure in the chamber 55 can be relieved gradually to avoid water hammer by reason of too sudden closing of the shut-off valve 24. If desired, a coiled compression spring may be provided under the head 71 around the stem 70 to urge the valve 68 normally upwardly to the operative position shown in Fig. 1, thus serving also to hold the lever 62 in locked position. The lower end portion 78 of the stem 65 forms a guide and bearing for the operating stem 43 and has an extension 79 of the bore 69 therein, whereby when fluid under pressure is admitted to the diaphragm chamber 55 it is also delivered to the chamber 80 formed in the lower end of the stem 43 between the plug 45 and the lower end portion 78 of the stem 65 to aid further in seating the stem plate under pressure. The pressure applied to the stem plate 14 to seat the same in the manner described is, of course, many times that exerted by the springs 27' and 47 in the opposite direction.

It is believed the foregoing description conveys a good understanding of the objects and advantages of my invention. The appended claims have been drawn to cover all legitimate modifications and adaptations.

I claim:

1. In a plate type valve the combination of a ported body member, a ported valve plate member adapted to effect different communication between the ports in the body member in different positions of rotation of the valve plate member, a cover on the body member enclosing said valve plate member, spring means cooperating with said valve plate member to press the same resiliently into sealed operative relationship to the body member, means for loading said spring means to seat the valve plate member under increased spring pressure comprising pressure fluid operable means and valve means for controlling the release of pressure and communication of said pressure fluid operable means with a source of pressure fluid supply, and means for turning said valve plate member from one position to another.

2. In a plate type valve the combination of a ported body member, a ported valve plate member adapted to effect different communication between the ports in the body member in different positions of rotation of the valve plate member, a cover on the body member enclosing said valve plate member, spring means cooperating with said valve plate member to press the same resiliently into sealed operative relationship to the body member, said body member having a pressure port normally communicating with the inside of the cover, a shut-off valve for closing said port, combined means for loading said spring means for seating the valve plate member under increased spring pressure and unseating said shut-off valve comprising pressure fluid operable means and valve means for controlling the release of pressure and communication of said pressure fluid operable means with a source of pressure fluid supply, and means for turning the valve plate member from one position to another.

3. In a plate type valve the combination of a ported body member, a ported valve plate member adapted to effect different communication between the ports in the body member in different positions of rotation of the valve plate member, a cover on the body member enclosing said valve plate member, spring means cooperating with said valve plate member to press the same resiliently into sealed operative relationship to the body member, means for loading said spring means to seat the valve plate member under increased spring pressure comprising pressure fluid operable means and valve means for controlling the release of pressure and communication of said pressure fluid operable means with a source of pressure fluid supply, manually operable means for turning the valve plate member from one position to another, and means operable by said manually operable means preliminary to the turning of the valve plate member to operate said last-mentioned valve means to relieve pressure in said pressure fluid operable means.

4. In a plate type valve the combination of a ported body member, a ported valve plate member adapted to effect different communication between the ports in the body member in different positions of rotation of the valve plate member, a cover on the body member enclosing said valve plate member, spring means cooperating with said valve plate member to press the same resiliently into sealed operative relationship to the body member, said body member having a pressure port normally communicating with the inside of the cover, a shut-off valve for closing said port, combined means for loading said spring means for seating the valve plate member under increased spring pressure and unseating said shut-off valve comprising pressure fluid operable means and valve means for controlling the release of pressure and communication of said pressure fluid operable means with a source of pressure fluid supply, manually operable means for turning the valve plate member from one position to another, and means operable by said manually operable means preliminary to the turning of the valve plate member to operate said last-mentioned valve means to relieve pressure in said pressure fluid operable means.

5. In a plate type valve the combination of a ported body member, a ported stem plate adapted to effect different communication between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate selectively to transmit rotation thereto and press said plate into sealed operative relationship to the body member, valve means for controlling release of pressure and communication of said mechanism with a source of pressure fluid supply, and means for turning said stem.

6. A valve as set forth in claim 5 including compressible spring means interposed between said pressure-operable diaphragm mechanism and the stem plate arranged to be loaded by said mechanism to press the stem plate resiliently into sealed operative relationship to the body member.

7. A valve as set forth in claim 5 including spring means tending normally to unseat said stem plate, whereby to facilitate turning of the stem plate when pressure in the pressure fluid operable diaphragm mechanism is released.

8. A valve as set forth in claim 5 wherein said body member has a pressure port normally communicating with the inside of the cover, the valve including a shut-off valve for closing said port operable to opened position by said diaphragm mechanism concurrently with the application of seating pressure to said stem plate.

9. In a plate type valve the combination of a ported body member, a ported stem plate adapted to effect different communication between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate selectively to transmit rotation thereto and press said plate into sealed operative relationship to the body member, said stem having a pressure fluid passage provided therein communicating with a pressure chamber in said diaphragm mechanism, a pilot valve reciprocable with respect to said stem to control release of pressure through said passage and communication between said passage and a source of pressure fluid supply, and a manually operable hand lever pivotally connected to said stem to turn the same and operatively connected with said pilot valve to shift the latter upon pivotal movement of said lever.

10. A valve as set forth in claim 9 including index means in fixed circumferentially spaced relation with respect to said cover and body member with relation to which said hand lever is adapted to be turned to shift the stem plate from one operative position to another, and locking means on said lever and index means preventing rotation of said lever prior to pivotal movement thereof to a position corresponding to the pressure release position of said pilot valve.

11. A valve as set forth in claim 9 including index means in fixed circumferentially spaced relation with respect to said cover and body member with relation to which said hand lever is adapted to be turned to shift the stem plate from one operative position to another, there being radial key slots provided in one of said cover and body members in radial alignment with said index means, and a locking key on said hand lever for engagement selectively in any one of said slots, said key and slots being so related whereby when said lever is moved to a position entering the key in one of said slots, said pilot valve is disposed in its operative position admitting pressure fluid to the pressure fluid operable diaphragm mechanism.

12. In a plate type valve the combination of a ported body member, a ported valve plate member adapted to effect different communication between the ports in the body member in different positions of rotation of the valve plate member, a cover on the body member enclosing said valve plate member, spring means cooperating with said valve plate member to press the same resiliently into sealed operative relationship to the body member, means for loading said spring means to seat the valve plate member under increased spring pressure comprising pressure fluid operable means and valve means for controlling the release of pressure and communication of said pressure fluid operable means with a source of pressure fluid supply, manually operable means for turning the valve plate member from one position to another, and means operable by said manually operable means preliminary to the turning of the valve plate member to operate said last-mentioned valve means.

13. In a plate type valve the combination of a ported body member, a ported valve plate member adapted to effect different communication between the ports in the body member in different positions of rotation of the valve plate member, a cover on the body member enclosing said valve plate member, spring means cooperating with said valve plate member to press the same resiliently into sealed operative relationship to the body member, said body member having a pressure port normally communicating with the inside of the cover, a shut-off valve for closing said port, combined means for loading said spring means for seating the valve plate member under increased spring pressure and unseating said shut-off valve comprising pressure fluid operable means and valve means for controlling the release of pressure and communication of said pressure fluid operable means with a source of pressure fluid supply, manually operable means for turning the valve plate member from one position to another, and means operable by said manually operable means preliminary to the turning of the valve plate member to operate said last-mentioned valve means.

14. In a plate type valve the combination of a ported body member, a ported stem plate adapted to effect different communication between the ports in the body member in different positions of the plate, a cover on the body member enclosing the plate, a rotatable stem extending into said cover, a pressure-operable diaphragm mechanism mounted on said stem inside said cover for rotation therewith and operatively connected with said stem plate selectively to transmit rotation thereto and press said plate into sealed operative relationship to the body member, said stem having a pressure fluid passage provided therein communicating with a pressure chamber is said diaphragm mechanism, valve means for controlling release of pressure and communication between said passage and a source of pressure fluid supply, and means for turning said stem.

15. In a plate type valve the combination of a ported body member, a ported stem plate adapted to effect different communication between the ports in the body member in different positions of the plate, a cover on the body member enclosing the plate, a rotatable stem extending into said cover, a pressure fluid housing mounted on said stem inside said cover for rotation with said stem, a flexible diaphragm connected to said housing and forming a closure therefor, a plunger in telescoping relation to said stem operatively connected with said diaphragm whereby endwise movement is transmitted thereto by said diaphragm relative to the stem when pressure fluid is admitted to said housing, means whereby said stem and plunger are caused to turn together, means operatively connecting said plunger with said stem plate whereby to transmit rotation thereto, said body member having a pressure port normally communicating with the inside of the cover, a shut-off valve for opening and closing said port operable by said plunger, valve means for controlling release of pressure and communication of said housing with a source of pressure fluid supply, and means for turning said stem.

16. A valve as set forth in claim 15, including spring means tending normally to unseat said stem plate whereby to facilitate turning of said stem plate.

17. A valve as set forth in claim 15, including compressible spring means between the stem plate and diaphragm arranged to be loaded when pressure fluid is admitted to said housing, whereby to seat the stem plate resiliently under increased spring pressure.

18. A valve as set forth in claim 15, including spring means for unseating said stem plate to facilitate turning thereof, and compressible spring means between the stem plate and diaphragm to arrange to be loaded when pressure fluid is admitted to said housing, whereby to seat the stem plate resiliently under increased spring pressure.

19. In a plate type valve the combination of a ported body member, a ported stem plate adapted to effect different communication between the ports in the body member in different positions of the plate, a cover on the body member enclosing the plate, a rotatable stem extending into said cover, a pressure fluid housing mounted on said stem inside said cover for rotation with said stem, a flexible diaphragm connected to said housing and forming a closure therefor, a plunger in telescoping relation to said stem operatively connected with said diaphragm whereby endwise movement is transmitted thereto by said diaphragm relative to the stem when pressure fluid is admitted to said housing, means whereby said stem and plunger are caused to turn together, means operatively connecting said plunger with said stem plate whereby to transmit rotation thereto, means whereby seating pressure is transmitted to said stem plate by said plunger when pressure fluid is admitted to said housing, valve means for controlling release of pressure and communication of said housing with a source of pressure fluid supply, and means for turning said stem.

20. A valve as set forth in claim 19, wherein the means whereby seating pressure is transmitted to said stem plate by said plunger includes compressible spring means arranged to be loaded when pressure fluid is admitted to said housing to seat the stem plate resiliently under increased pressure.

21. A valve as set forth in claim 19, including spring means tending normally to unseat said stem plate whereby to facilitate turning the stem plate.

22. In a plate type valve the combination of a ported body member, a ported stem plate adapted to effect different communication between the ports in the body member in different positions of the plate, a cover on the body member enclosing the plate, a rotatable stem extending into said cover, a pressure fluid housing mounted on said stem inside said cover for rotation with said stem, a flexible diaphragm connected to said housing and forming a closure therefor, a plunger in telescoping relation to said stem operatively connected with said diaphragm whereby endwise movement is transmitted thereto by said diaphragm relative to the stem when pressure fluid is admitted to said housing, said diaphragm serving to transmit rotation from said housing to said plunger upon rotation of said stem, means for transmitting rotation from said plunger to said stem plate, valve means for controlling release of pressure and communication of said housing with a source of pressure fluid supply, and means for turning said stem.

ANDREW KROMHOUT.

REFERENCES CITED

The following references are of record in the file of this patent:

UNITED STATES PATENTS

| Number | Name | Date |
|---|---|---|
| 658,720 | Kelly | Sept. 25, 1900 |
| 1,314,584 | Yeiser | Sept. 2, 1919 |
| 1,553,164 | Hook | Sept. 8, 1925 |
| 2,047,131 | Riche | July 7, 1936 |
| 2,093,692 | Daniels | Sept. 21, 1937 |
| 2,209,989 | McCanna | Aug. 6, 1940 |
| 2,209,992 | McGill | Aug. 6, 1940 |
| 2,326,686 | Rutledge | Aug. 10, 1943 |
| 2,361,214 | Krone | Oct. 24, 1944 |